(12) United States Patent
Somoza et al.

(10) Patent No.: US 11,345,226 B1
(45) Date of Patent: May 31, 2022

(54) KINETIC ENERGY TRANSFERENCE DEVICE METHOD AND DEVICES

(71) Applicants: Karin M Somoza, Los Angeles, CA (US); Curtis Somoza, Los Angeles, CA (US); Allen Jones, Imperial Beacn, CA (US)

(72) Inventors: Karin M Somoza, Los Angeles, CA (US); Curtis Somoza, Los Angeles, CA (US); Allen Jones, Imperial Beacn, CA (US)

( * ) Notice: Subject to any disclaimer, the term of this patent is extended or adjusted under 35 U.S.C. 154(b) by 0 days.

(21) Appl. No.: 17/488,020

(22) Filed: Sep. 28, 2021

(51) Int. Cl.
| | |
|---|---|
| *B60K 6/10* | (2006.01) |
| *B60K 25/02* | (2006.01) |
| *B60K 6/30* | (2007.10) |
| *B60K 6/365* | (2007.10) |
| *B60K 6/543* | (2007.10) |

(52) U.S. Cl.
CPC ............. *B60K 6/105* (2013.01); *B60K 6/30* (2013.01); *B60K 6/365* (2013.01); *B60K 6/543* (2013.01); *B60K 25/02* (2013.01)

(58) Field of Classification Search
CPC .......... B60K 6/105; B60K 6/30; B60K 6/365; B60K 6/543; B60K 25/02; B60L 50/30
See application file for complete search history.

(56) References Cited

U.S. PATENT DOCUMENTS

| | | | |
|---|---|---|---|
| 7,416,039 B1* | 8/2008 | Anderson | B60K 6/30 180/165 |
| 7,540,346 B2* | 6/2009 | Hu | B60K 6/105 180/165 |
| 8,967,305 B2* | 3/2015 | Manganaro | B60K 7/0007 180/65.31 |
| 9,358,865 B1* | 6/2016 | Sherry | B60W 30/04 |

* cited by examiner

*Primary Examiner* — John D Walters
(74) *Attorney, Agent, or Firm* — Edmond DeFrank

(57) ABSTRACT

The embodiments disclose a method including transferring kinetic energy from a kinetic energy source to a flywheel storage device system, transferring all or a portion of the kinetic energy stored to a continually variable transmission planetary gear system, integrating a multiple axis mechanism kinetic energy transference device to the continually variable transmission planetary gear system, integrating multiple speed governors in the multiple axis mechanism kinetic energy transference device, coupling a computer controlled module to each of the speed governors, processing operational data with the computer controlled modules to determine a measured most efficient use of the kinetic energy for each operation, transmitting the operation measured most efficient use amount of the kinetic energy from the computer controlled module to the corresponding speed governor, transferring the amount of the kinetic energy through gears and output shafts/drive shafts to serve operations and storing surplus kinetic energy not needed for operations in the flywheel storage system.

20 Claims, 18 Drawing Sheets

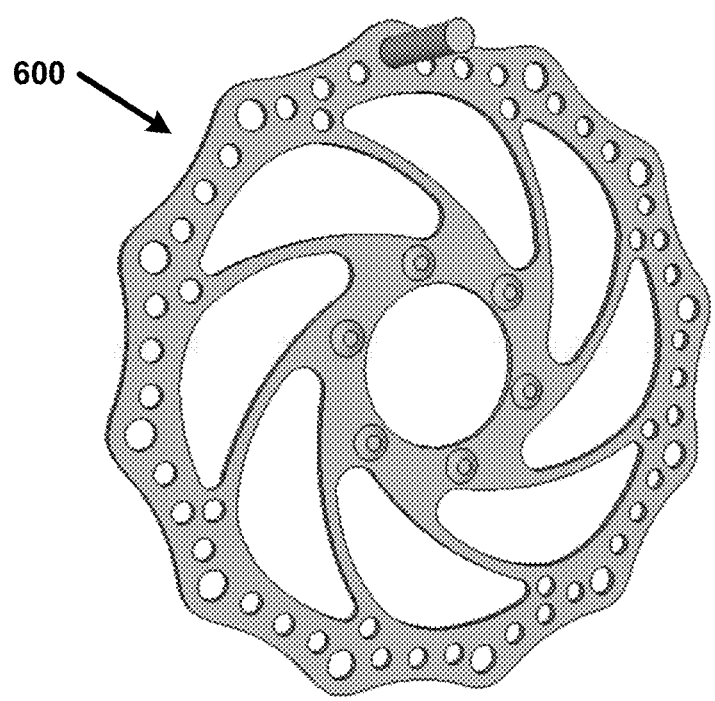
FIG. 6A
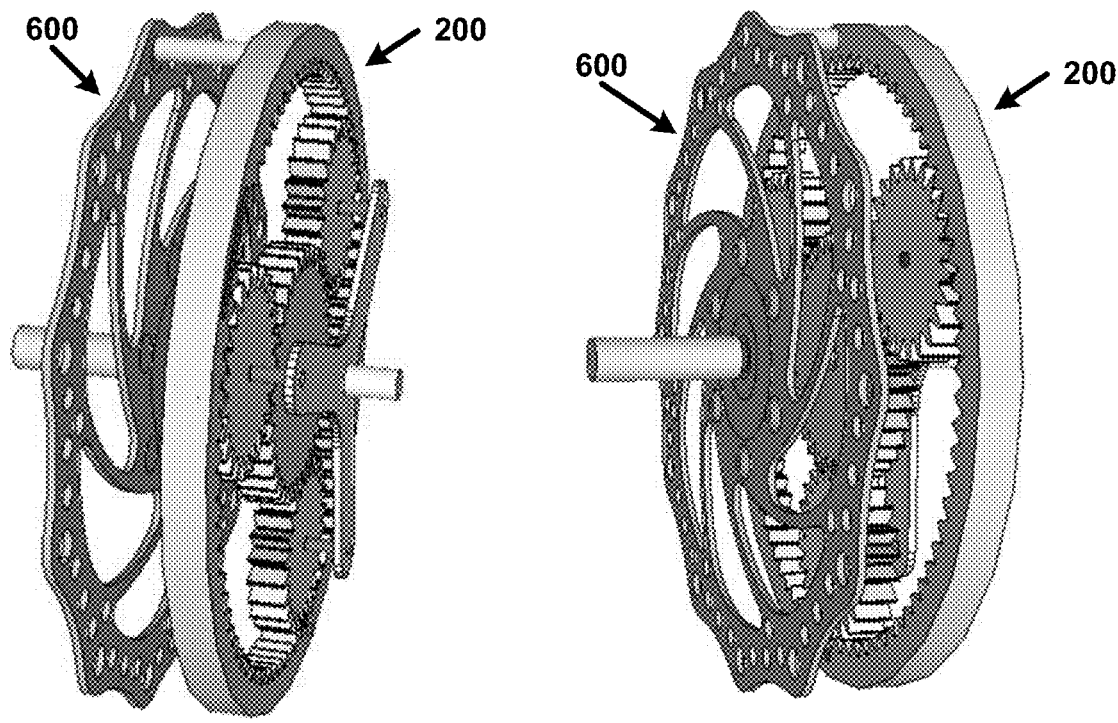
FIG. 6B   FIG. 6C

KINETIC ENERGY TRANSFERENCE DEVICE METHOD AND DEVICES

BACKGROUND

Flywheel technology has been around a long time and has many benefits over other energy storage systems. The one major drawback is the energy loss to add and draw energy out of the flywheels. An electric motor/generator loses energy through heat/friction during both the input and output phases. Chemical batteries used to store energy experience excess heat from massive power inputs or outputs causing loss of energy.

BRIEF DESCRIPTION OF THE DRAWINGS

FIG. 6A shows for illustrative purposes only an example of a lobed disc of one embodiment.

FIG. 6B shows for illustrative purposes only an example of a lobed disc coupled to a planetary gear set from the gear set prospective of one embodiment.

FIG. 6C shows for illustrative purposes only an example of a lobed disc coupled to a planetary gear set from the lobed disc prospective of one embodiment.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of a kinetic energy transference device method and devices is described for illustrative purposes and the underlying system can apply to any number and multiple types use applications. In one embodiment of the present invention, the kinetic energy transference device method and devices can be configured using a multiple axis mechanism. The kinetic energy transference device method and devices can be configured to include a gate or speed governor and can be configured to include a computer controlled module using the present invention.

Figure 1:
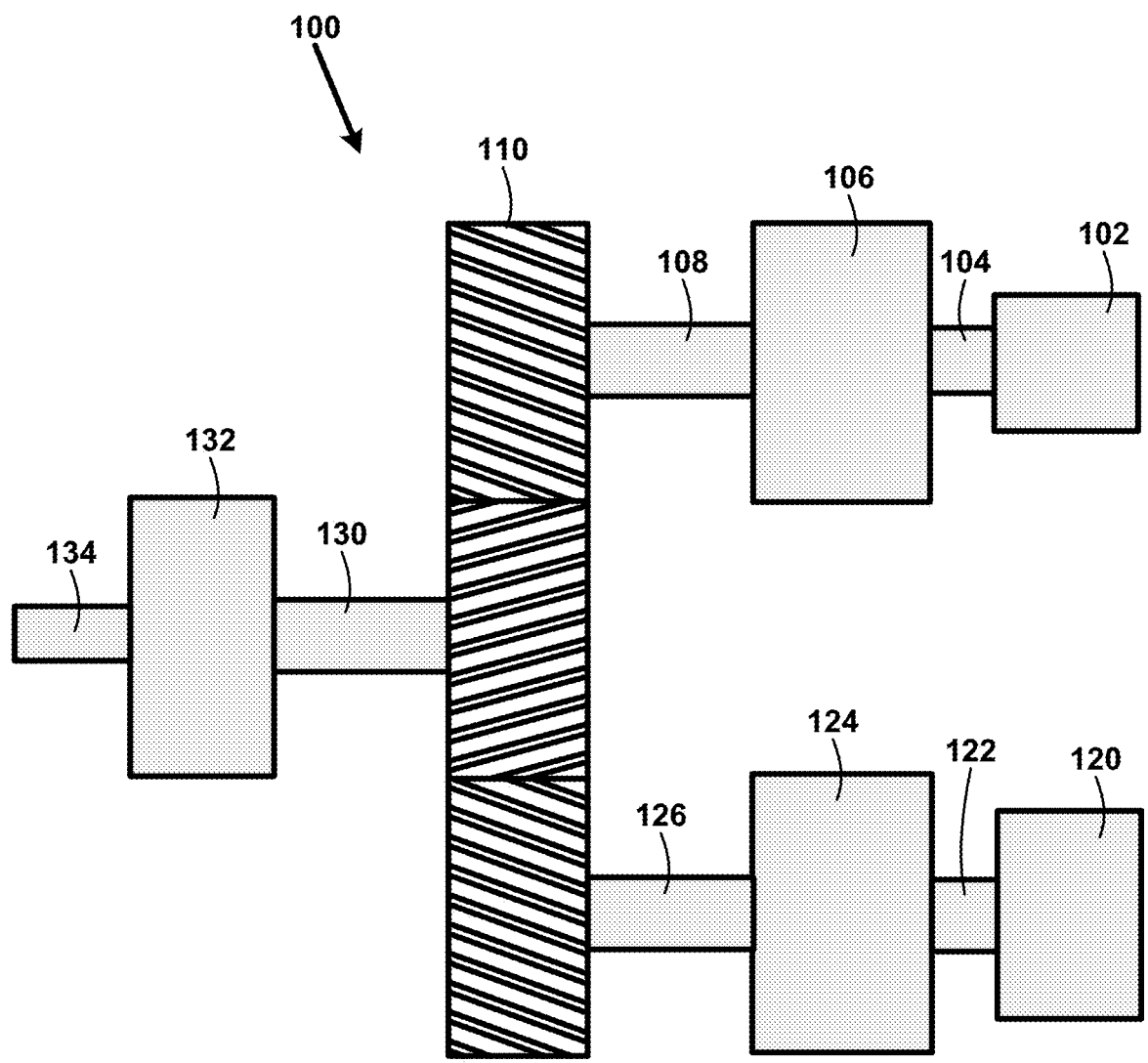
FIG. 1 shows for illustrative purposes only an example of a kinetic energy transference device of one embodiment.

FIG. 1 shows for illustrative purposes only an example of a kinetic energy transference device of one embodiment. FIG. 1 shows a kinetic energy transference device 100 with a primary kinetic source for example a gas engine 102 transferring force through the primary kinetic source axle 104 of FIG. 1 to CVT planetary gear system and gate #1 106. The transferred force is input #1 108 that is transferred to a planetary gear set 110. The transferred force is stored in the flywheel storage system 120 through the CVT planetary gear system secondary kinetic axle 122 and gate #2 124 in one instance. In another instance force is transferred from the flywheel storage system 120 through the CVT planetary gear system and gate #2 124 to INPUT #2 axle 126 to the planetary gear set 110.

In one embodiment from the planetary gear set 110 force (kinetic energy) is transferred to an automobile wheel 134 through an output automobile wheel 130 axle through a CVT planetary gear system and gate #3 132. In another embodiment force (kinetic energy) is transferred from the automobile wheel 134 through the CVT planetary gear system and gate #3 132 and output automobile wheel 130 axle to the planetary gear set 110. This force is stored in the flywheel storage system 120 in one embodiment.

The kinetic energy transference device (KETD) 100 is integrated into a continually variable transmission (CVT) planetary gear system 110. A primary kinetic source is coupled to the primary kinetic source axle 104. The primary kinetic source axle 104 is coupled to the primary kinetic source transfer gear. A first speed governed kinetic energy transfer gear coupled to the first speed governor transfers the measured amount of kinetic energy needed to provide the most efficient use of the energy for a first operation through the first speed governed kinetic energy axle.

The excess speed is always transferred into the moving gate. This moving gate flows at the speed that is subtracted from the input speed to provide the desired output speed. No excess speed leaves the CVT planetary gear system. The speed is divided into two paths, with one being the speed of the gate and the other being to flow out to the desired load. The first computer controlled module analyses the kinetic energy imparted from the primary kinetic source and the kinetic energy needed to provide the most efficient use of the energy for a first operation to determine the measured amount of kinetic energy to transfer through the first speed governor. The measured amount of kinetic energy determined is transmitted to the first speed governor. The first speed governor adjusts the kinetic energy control devices to impart to the measured amount of kinetic energy to the first speed governed kinetic energy axle.

Data received from the second operation system is processed in the second computer controlled module and analyzed to determine the current kinetic energy needed for the second operation. The second speed governor makes adjustments in the kinetic energy control devices to transfer additional kinetic energy to the second operation system. The additional kinetic energy from the stored kinetic energy is transferred from the KETD flywheel surplus kinetic energy transfer gear to a second speed governed kinetic energy transfer gear coupled to a second speed governed etic energy axle.

The KETD flywheel surplus kinetic energy transfer gear is coupled to the third computer controlled module that is coupled to the KETD flywheel surplus kinetic energy axle. The third computer controlled module receives data from the first computer controlled module and second computer controlled module. The data received from the two modules is analyzed by the third computer controlled module to determine how much surplus kinetic energy to transfer to one of the operations of one embodiment.

DETAILED DESCRIPTION

Figure 2:
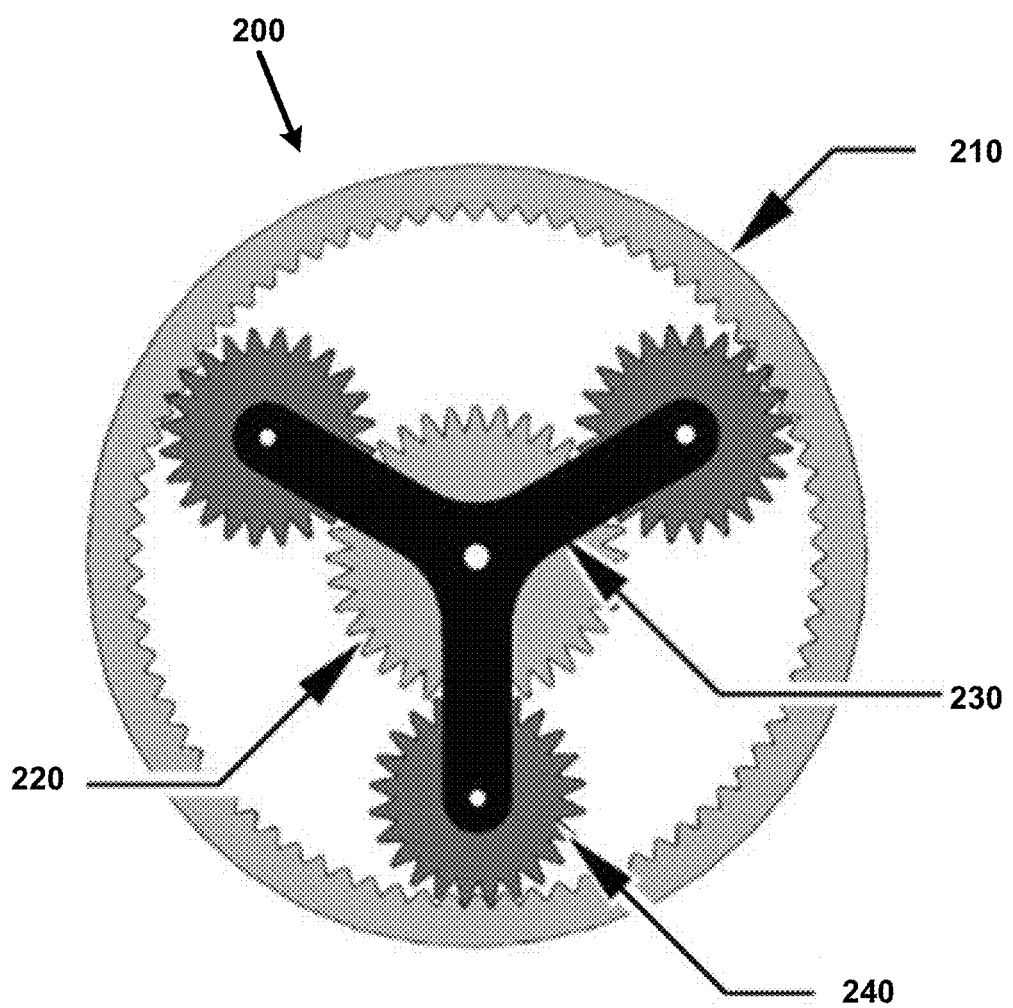
FIG. 2 shows for illustrative purposes only an example of a planetary gear system of one embodiment.

FIG. 2 shows for illustrative purposes only an example of a planetary gear system of one embodiment. FIG. 2 shows a planetary gear system 200 forming a kinetic energy transfer gear set connected to the CVT planetary gear system 110 of FIG. 1. A sun gear 220 is connected to the input side of the CVT planetary gear system 110 of FIG. 1 and each planet gear 240. A planetary carrier 230 is connected to the output side of the CVT planetary gear system 110 of FIG. 1 and each planet gear 240. A ring gear 210 is connected to the Speed Governor. The speed of the sun gear 220 (input) minus the speed of the ring gear also referred to as a speed governor equals the speed of the carrier gear 240 (Output). This calculation assumes the gears are equal sizes. A change in the proportion of the gears will change the ratio but the overall effect is the same.

Figure 3A:
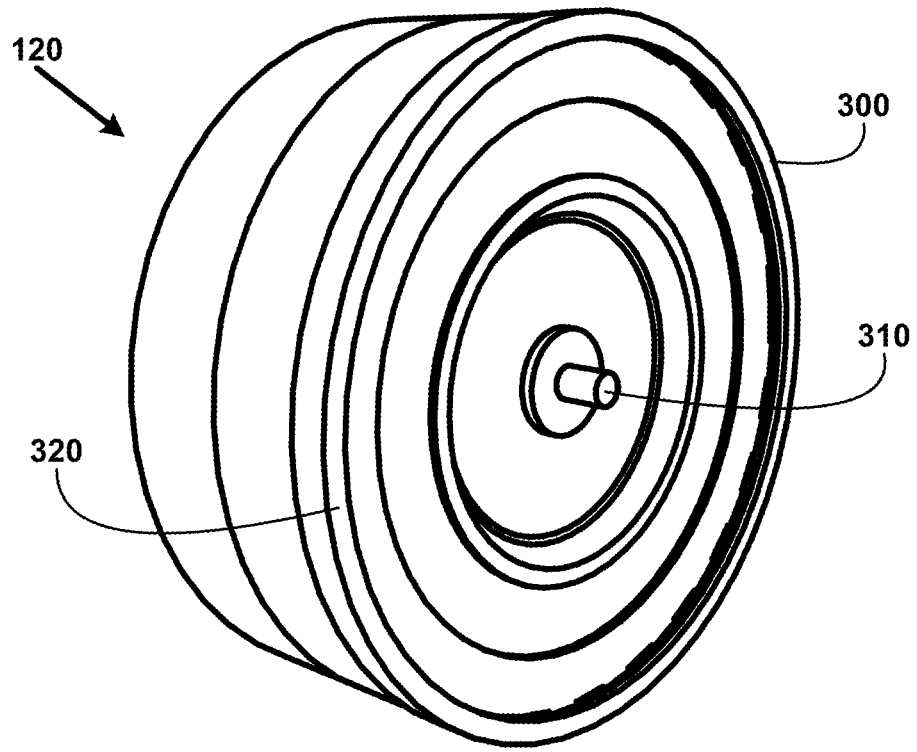
FIG. 3A shows for illustrative purposes only an example of a flywheel storage system of one embodiment.

Flywheel Storage System:

FIG. 3A shows for illustrative purposes only an example of a flywheel storage system of one embodiment. FIG. 3A shows a flywheel storage system 120 in a flywheel containment 300 housing. The flywheel containment 300 housing includes an air tight case 320 allowing a vacuum to be created inside flywheel containment housing 300. A flywheel axle 310 is rotated with a speed and force delivered through a coupled planetary gear system 200 of FIG. 2 kinetic energy transfer drive train of one embodiment.

The primary kinetic energy source to the flywheel storage system 120. The flywheel storage system 120 is coupled to the continually variable transmission (CVT) planetary gear system 110. The CVT planetary gear system 110 is integrated with a multiple axis mechanism kinetic energy transference device. The multiple axis mechanism kinetic energy transference devices include multiple gates or speed governors, wherein each is configured to include a computer controlled module. The computer controlled modules process operational data to determine a measured most efficient use of the kinetic energy for each operation.

The measured most efficient use amount of the kinetic energy for each operation is transmitted to the multiple gates or speed governors. The multiple gates or speed governors make adjustments in speed many times a second. The adjusted speeds transfer of the measured amount of the kinetic energy for each operation is made through multiple gears and output shafts/drive shafts to serve each operation. Surplus kinetic energy not needed for operations is stored in the flywheel storage system of one embodiment.

Figure 3B:
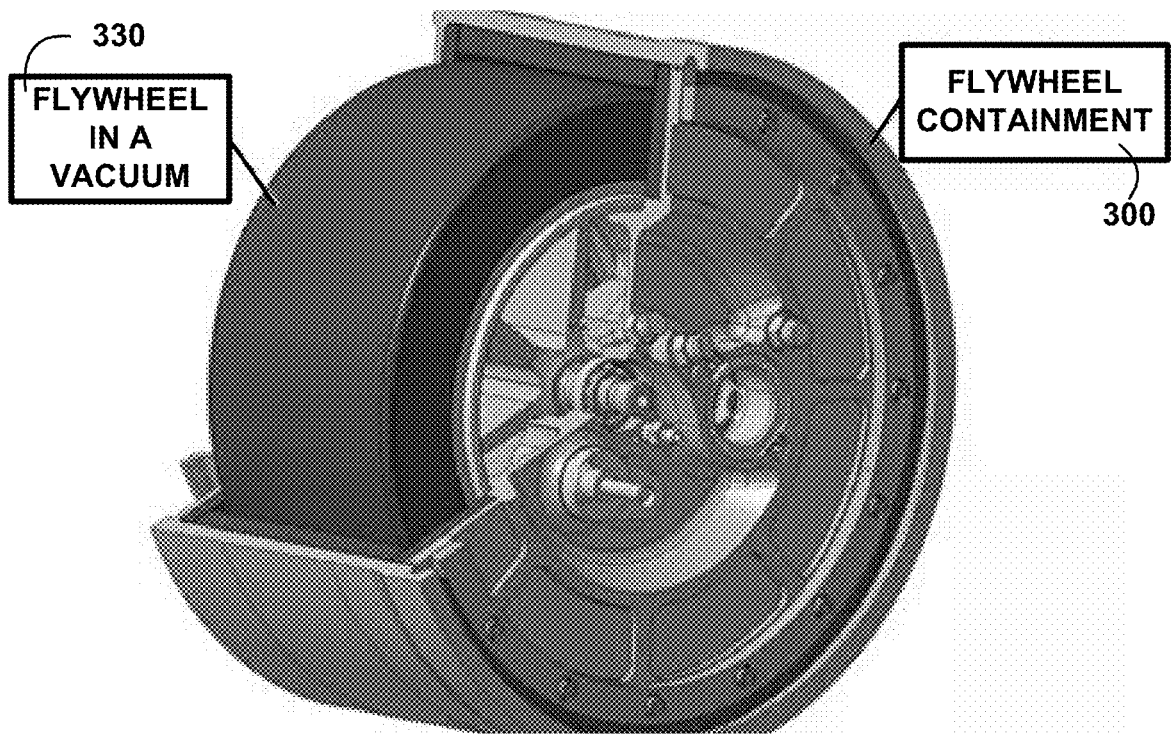
FIG. 3B shows for illustrative purposes only an example of a vacuum sealed flywheel storage system of one embodiment.

Flywheel in a Vacuum:

FIG. 3B shows for illustrative purposes only an example of a vacuum sealed flywheel storage system of one embodiment. FIG. 3B shows a cut-away of the flywheel containment 300 housing. The cut-away of the flywheel containment 300 housing reveals a flywheel in a vacuum. The creation of the vacuum surrounding the flywheel reduces drag that would be caused by air within the air tight case 320 of FIG. 3A increasing the efficiency of the flywheel of one embodiment.

Figure 4:
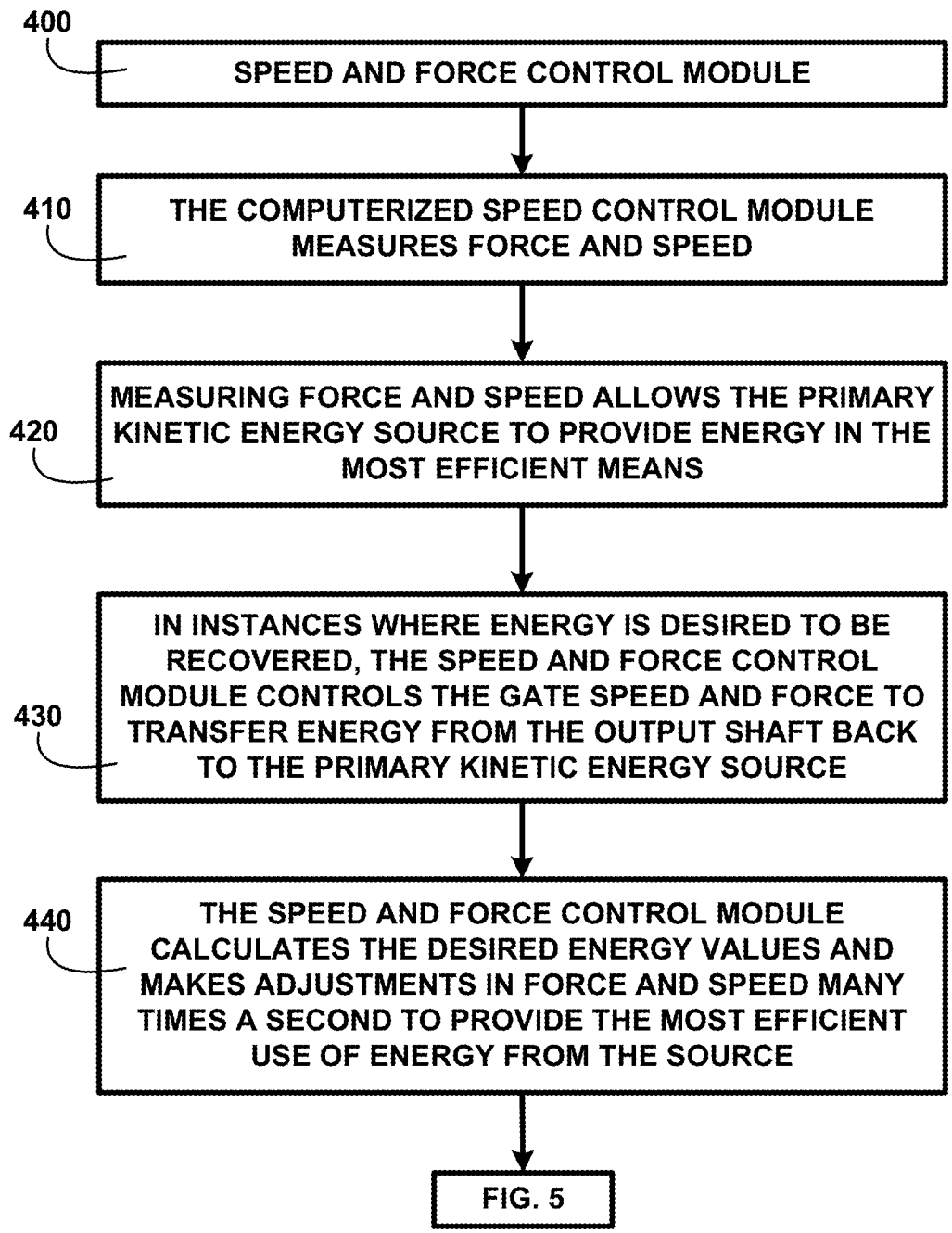
FIG. 4 shows a block diagram of an overview of a speed and force control module of one embodiment.

Speed and Force Control Module:

FIG. 4 shows a block diagram of an overview of a speed and force control module of one embodiment. FIG. 4 shows a speed and force control module 400. The computerized speed control module measures force and speed 410. Measuring force and speed allows the primary kinetic energy source to provide energy in the most efficient means 420. In instances where energy is desired to be recovered, the speed and force control module controls the gate speed and force to transfer energy from the output shaft back to the primary kinetic energy source 430. The speed and force control module calculates the desired energy values and makes adjustments in force and speed many times a second to provide the most efficient use of energy from the source 440 of one embodiment.

In a system that only has an engine (power source) and an output (Automobile wheel), only one CVT planetary gear system is required since there is only one path energy can travel between the power source and automobile wheel. Regardless of which direction the energy is flowing, it can only flow through one path.

In a system where a third input/output is added, two more CVT planetary gear systems are required to cover the 2 additional paths to function with the one added force source. For example, in a system with an engine (Gas), a Flywheel storage system 120 of FIG. 1, and an automobile wheel, three CVT planetary gear systems are needed for the three different paths energy can flow. Path 1: Energy can run from the Engine to the Automobile wheel and back if needed. Path 2: Energy can run from the Engine to the Flywheel and back if needed. Path 3: Energy can run from the Flywheel to the Automobile wheel and back if needed.

There is a need for each source to have a CVT planetary gear system 120 of FIG. 1 because, in order to force energy into the desired location, the gate on the side that is not accepting or delivering the energy needs to be resisting and at a higher level than the receiving side. If you are directing energy being recovered from the Automobile wheel into the Flywheel, the Gate on the Engine side must be resisting at a higher level than the flywheel in order to force that energy into the flywheel.

When working with two or more CVT planetary gear systems with their corresponding Gate control module, a Master Control Module must be in place to correspond with the different gate controls. Continuous monitoring of the energy demands and availability is needed to properly set the correct gate speed and force of the different CVT planetary gear system 120 of FIG. 1 gates in order to properly direct the transference of energy to and from its desired locations. Each CVT planetary gear system 120 of FIG. 1 is controlled by its own force control module. Each force control module is controlled by a Master Control Module. The master control module sets the speed and/or pressure of the CVT planetary gear system speed governors/gates to direct the energy in the direction desired. Other embodiments include an electric motor/generator in place of the gas engine with batteries to store and deliver energy.

A first speed governed kinetic energy transfer gear coupled to the first speed governor 842 transfers the measured amount of kinetic energy needed to provide the most efficient use of the energy for a first operation through the first speed governed kinetic energy axle 844. The excess speed not needed for the first operation is transferred out a separate path to a KETD flywheel surplus kinetic energy transfer gear. The first computer controlled module 840 includes a first digital processor and a first transceiver.

Figure 7:
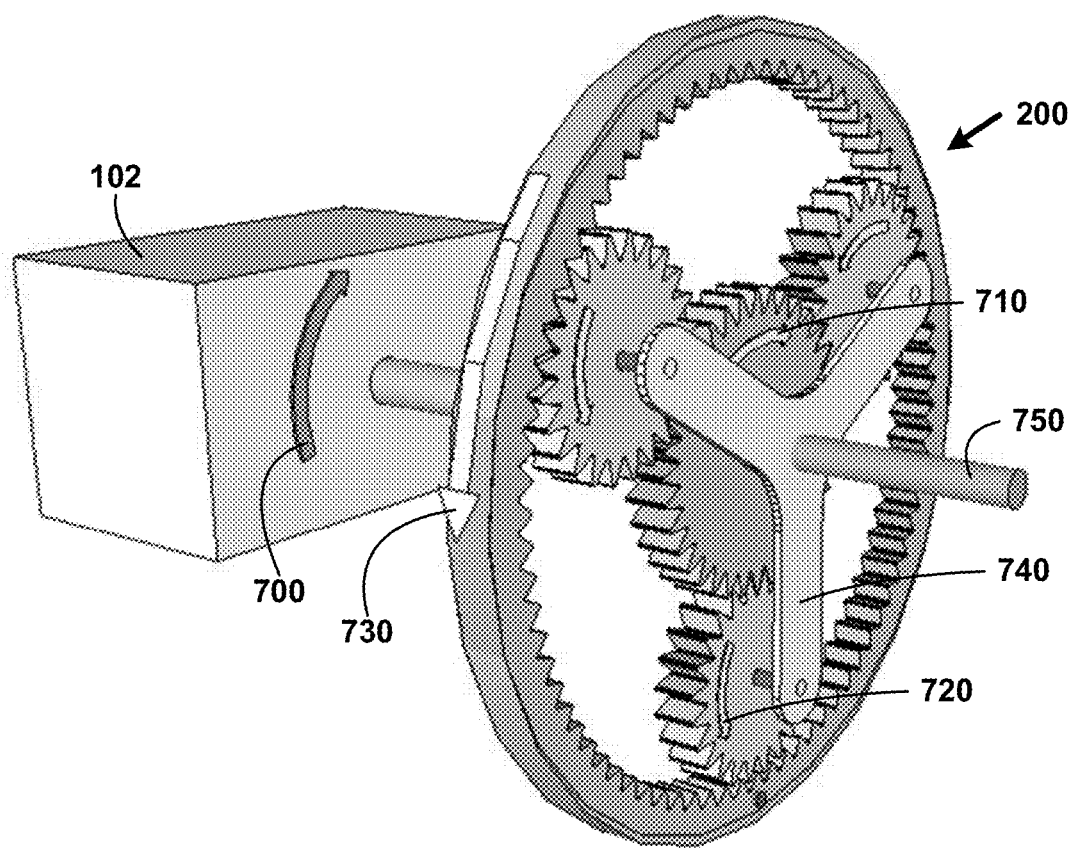
FIG. 7 shows for illustrative purposes only an example of planetary gear set movement of one embodiment.

The first computer controlled module 840 using the first digital processor analyses the kinetic energy imparted from the primary kinetic source 700 of FIG. 7 and the kinetic energy needed to provide the most efficient use of the energy for a first operation to determine the measured amount of kinetic energy to transfer through the first speed governor 842. The measured amount of kinetic energy determined is transmitted using wirelessly bidirectional signals from a first transceiver to the first speed governor 842. The first speed governor 842 adjusts the kinetic energy control devices to impart to the measured amount of kinetic energy to the first speed governed kinetic energy axle 844.

Data is received through a second transceiver from the second operation system. The data provided is processed in the second computer controlled module 850 where a second digital processor analyses the current kinetic energy needed for the second operation and an existing kinetic energy being received to determine if additional kinetic energy is needed or whether the existing kinetic energy being received is in excess of the current kinetic energy needed creating a surplus of kinetic energy.

The determination of a shortfall or surplus is transmitted in this instance over a hard wired cabling in lieu of using the second speed governor 852 installed transceiver. The second speed governor 852 makes adjustments in the kinetic energy control devices to in one embodiment transfer additional kinetic energy to the second operation system for example a braking system through the second speed governed kinetic energy axle 854.

In another embodiment a transfer of the surplus kinetic energy from the second operation system to the second speed governed kinetic energy transfer gear is made through the second speed governed kinetic energy axle 854. In the latter instance any surplus kinetic energy obtained from the second operation is transferred from the second speed governed kinetic energy transfer gear to the KETD flywheel surplus kinetic energy transfer gear.

The KETD flywheel surplus kinetic energy transfer gear is coupled to the third computer controlled module that is coupled to the KETD flywheel surplus kinetic energy axle. The third computer controlled module includes a third digital processor and a third transceiver. The third transceiver receives data from the first computer controlled module 840 and second computer controlled module 850. The data received from the two modules is analyzed by the third digital processor to determine where and how much kinetic energy to transfer surplus kinetic energy and how much surplus kinetic energy is coming from the two sources if applicable of one embodiment. The description continues in FIG. 5.

Figure 5:
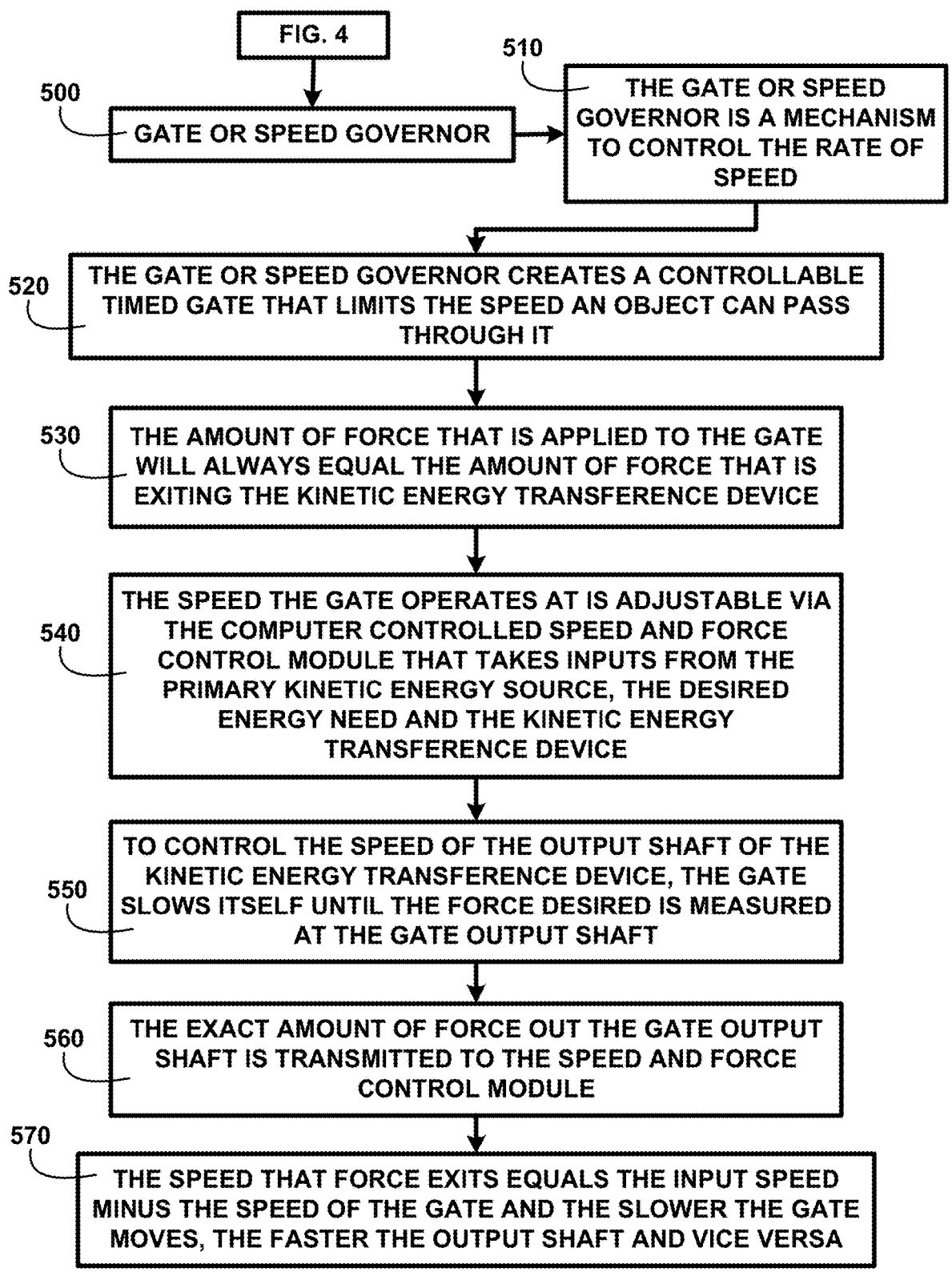
FIG. 5 shows a block diagram of an overview of a gate or speed governor of one embodiment.

Gate or Speed Governor:

FIG. 5 shows a block diagram of an overview of a gate or speed governor of one embodiment. FIG. 5 shows a continuation from FIG. 4 showing a gate or speed governor 500. The gate or speed governor is a mechanism to control the rate of speed 510. The gate or speed governor creates a controllable timed gate that limits the speed an object can pass through it 520. The amount of force that is applied to the gate will always equals the amount of force that is exiting the kinetic energy transference device 530. The speed the gate operates at is adjustable via the computer controlled speed and force control module that takes inputs from the primary kinetic energy source, the desired energy need and the kinetic energy transference device 540.

To control the speed of the output shaft of the kinetic energy transference device, the gate slows itself until the force desired is measured at the gate output shaft 550. The exact amount of force out the gate output shaft is transmitted to the speed and force control module 560. The speed that force exits equals the input speed minus the speed of the gate and the slower the gate moves, the faster the output shaft and vice versa 570 of one embodiment.

A Lobed Disc:

FIG. 6A shows for illustrative purposes only an example of a lobed disc of one embodiment. FIG. 6A shows a lobed disc 600 used in transferring kinetic energy from for example a wheel to a planetary gear set of one embodiment.

FIG. 6B shows for illustrative purposes only an example of a lobed disc coupled to a planetary gear set from the gear set prospective of one embodiment. FIG. 6B shows a lobed disc coupled to a planetary gear set from the gear set prospective. The lobed disc when speed and force are applied to the lobed disc transfers kinetic energy with a rod coupled to the ring gear of the planetary gear set of one embodiment.

FIG. 6C shows for illustrative purposes only an example of a lobed disc coupled to a planetary gear set from the lobed disc prospective of one embodiment. FIG. 6C shows a lobed disc coupled to a planetary gear set from the lobed disc prospective. A rotating lobed disc transfers the speed and force of its rotation to the ring gear. In one instance the speed and force energy transferred to the ring gear is further transferred to the flywheel of one embodiment.

Planetary Gear Set Movement:

FIG. 7 shows for illustrative purposes only an example of planetary gear set movement of one embodiment. FIG. 7 shows planetary gear set movement when speed and force of kinetic energy is transferred for a primary energy source. Seen are the different movements when the input is moving. The input in this instance is the primary kinetic source for example a gas engine 102 turning in this example in a gas engine clockwise direction 700. The primary kinetic source energy is transferred to the sun gear 220 of FIG. 2 which rotates also in a sun gear clockwise direction 710. The sun gear clockwise direction 710 is transferred to each carrier gear 240 of FIG. 2 that rotate in a carrier gear counter-clockwise direction 720.

The carrier gear counter-clockwise direction 720 rotates the ring gear 210 of FIG. 2 in a ring gear counter-clockwise direction 730. Each carrier gear 240 of FIG. 2 is coupled to the planetary carrier 230 of FIG. 2 that remains stationary. The CVT kinetic force is input into the sun gear and that force is split between the ring gears. The CVT is the speed governor and the carrier is the output. The speed/force is minus the speed/force to the ring gear equals the speed/force that exits the carrier shaft 750. The carrier gears move the carrier and do not enter the equation.

The force/speed can enter through the input/sun gear 220 of FIG. 2 or through the carrier shaft 750 when a car is decelerating. The ring gear controls which direction that force/speed goes, either into the ring gear or to the sun gear. When the CVT is connected to a Flywheel storage device, the energy can either come from it through the sun gear 220 of FIG. 2 or can be input back into it through the same gear. Depending on if the auto is accelerating or decelerating of one embodiment.

Figure 8:
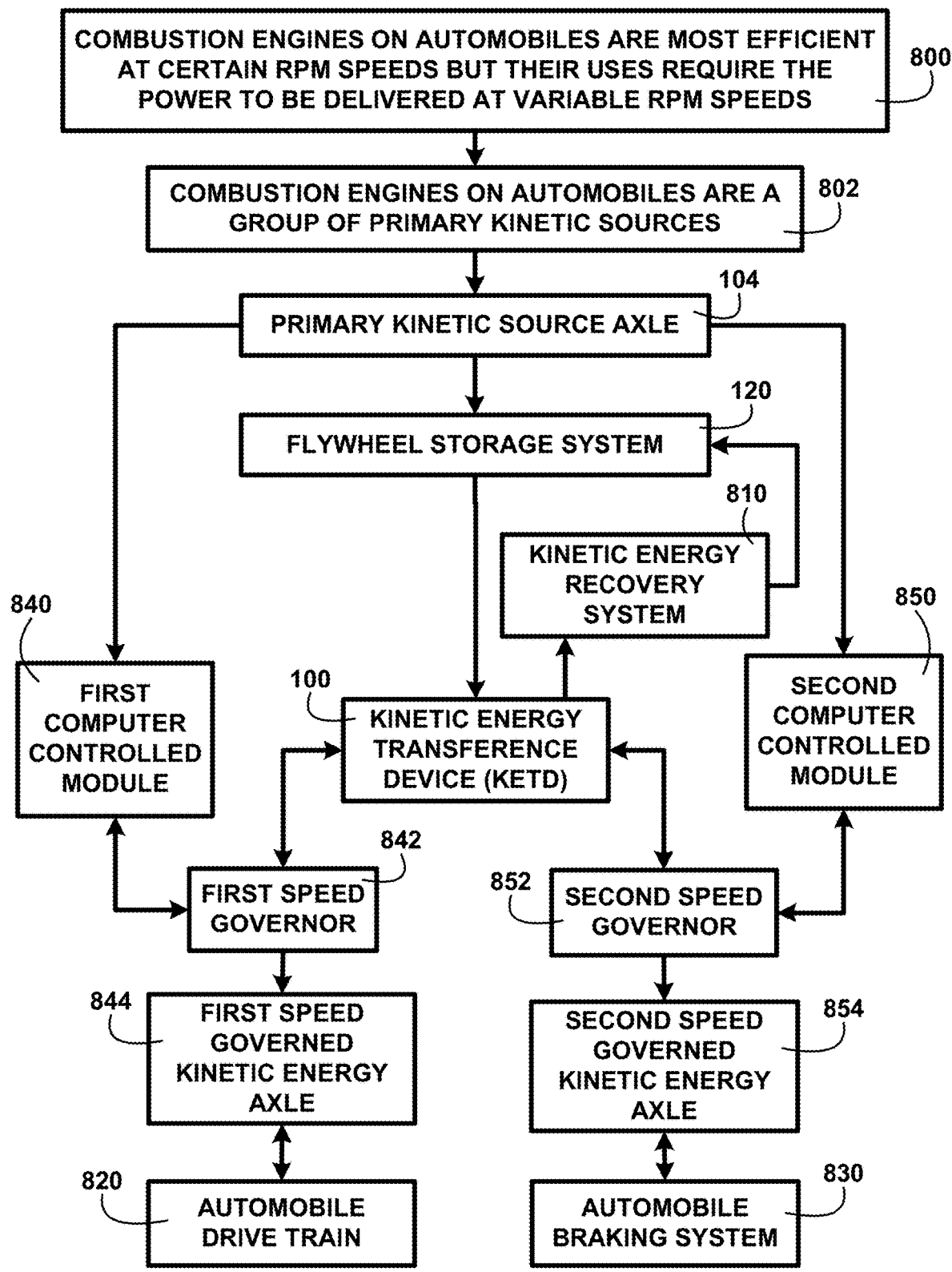
FIG. 8 shows a block diagram of an overview of primary kinetic source combustion engines on automobiles of one embodiment.

Primary Kinetic Source Combustion Engines on Automobiles:

FIG. 8 shows a block diagram of an overview of primary kinetic source combustion engines on automobiles of one embodiment. FIG. 8 shows combustion engines on automobiles are most efficient at certain rpm speeds but their uses require the power to be delivered at variable rpm speeds 800. In one embodiment combustion engines on automobiles are a group of primary kinetic sources 802. A primary kinetic source axle 104 is coupled to a flywheel storage system 120. A flywheel is used for a kinetic energy transference device (KETD) 100 in a kinetic energy recovery system 810.

A first computer controlled module 840 is electronically coupled to a first speed governor 842. The first speed governor 842 is coupled to the kinetic energy transference device (KETD) 100 and to a first speed governed kinetic energy axle 844. The first speed governed kinetic energy axle 844 is coupled to an automobile drive train 820 and is a mechanism to control the rate of speed of the automobile drive train 820.

A second computer controlled module 850 is electronically coupled to a second speed governor 852. The kinetic energy recovery system 810 determines any excess kinetic energy not needed by the automobile drive train 820. The excess kinetic energy determined is passed through to a second speed governed kinetic energy axle 854 for transference to an automobile braking system 830 of one embodiment.

Figure 9:
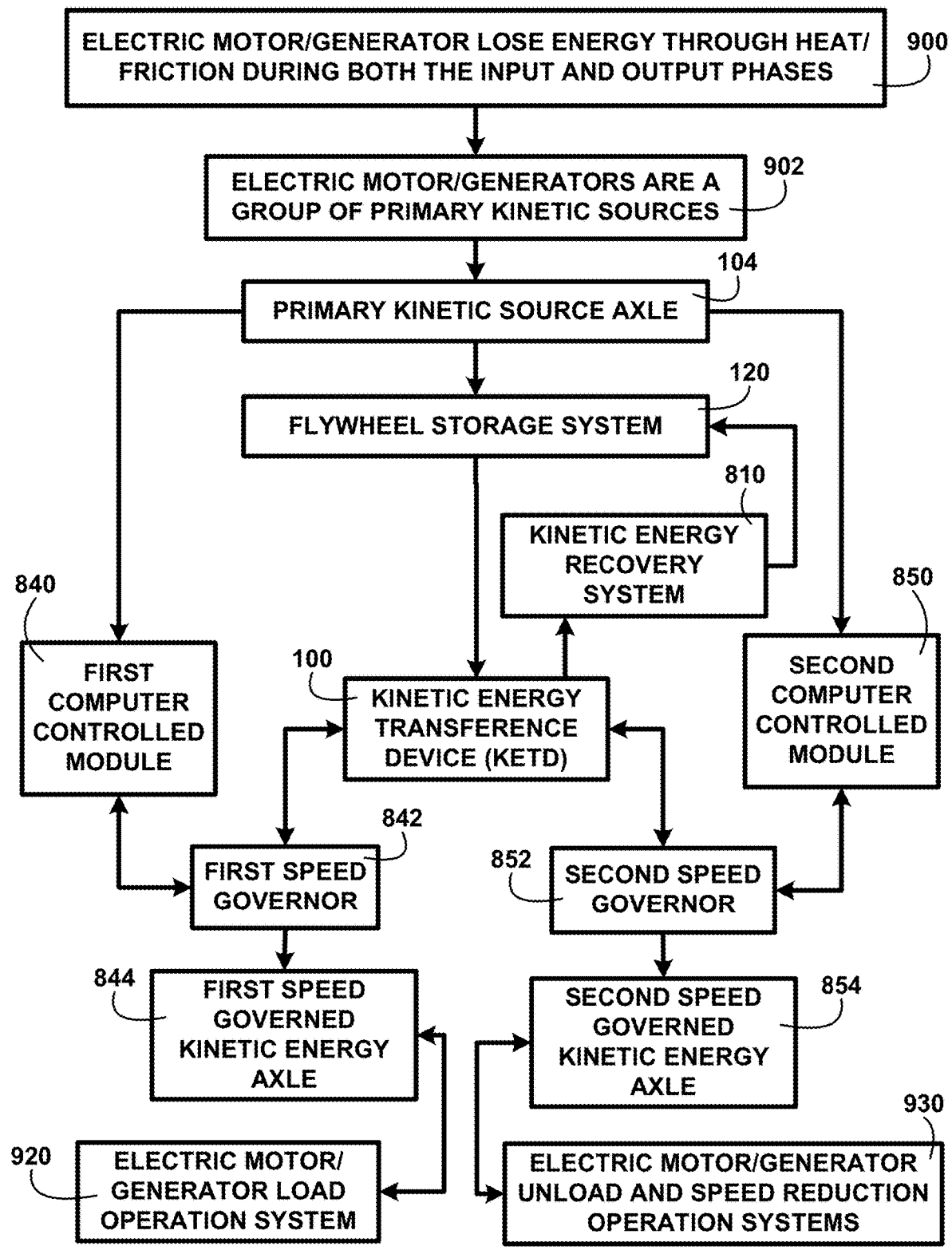
FIG. 9 shows a block diagram of an overview of primary kinetic source electric motor/generator of one embodiment.

Primary Kinetic Source Electric Motor/Generator:

FIG. 9 shows a block diagram of an overview of primary kinetic source electric motor/generator of one embodiment. FIG. 9 shows electric motor/generator loses energy through heat/friction during both the input and output phases 900. In one embodiment electric motor/generators are a group of primary kinetic sources 902. A primary kinetic source axle 104 is coupled to a flywheel storage system 120. A flywheel is used for a kinetic energy transference device (KETD) 100 in a kinetic energy recovery system 810.

A first computer controlled module 840 is electronically coupled to a first speed governor 842. The first speed governor 842 is coupled to the kinetic energy transference device (KETD) 100 and to a first speed governed kinetic energy axle 844. The first speed governed kinetic energy axle 844 is coupled to an electric motor/generator load operation system 920 and is a mechanism to control the rate of speed of the electric motor/generator load operation system 920.

A second computer controlled module 850 is electronically coupled to a second speed governor 852. The kinetic energy recovery system 810 determines any excess kinetic energy not needed by the electric motor/generator load operation system 920. The excess kinetic energy determined is passed through to a second speed governed kinetic energy axle 854 for transference to an electric motor/generator unload and speed reduction operation systems 930 of one embodiment.

Figure 10:
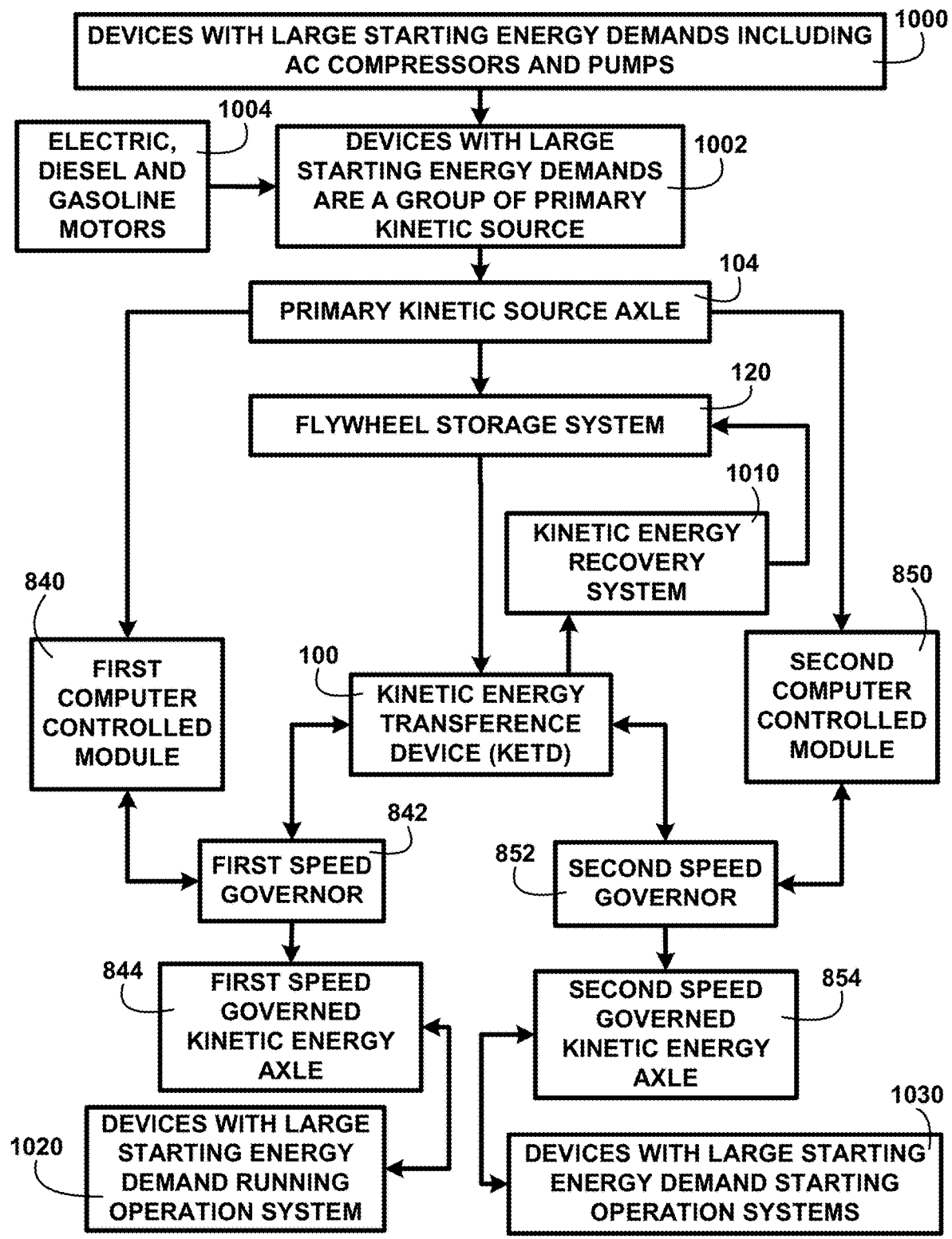
FIG. 10 shows a block diagram of an overview of primary kinetic source devices with large starting energy demands of one embodiment.

Primary Kinetic Source Devices with Large Starting Energy Demands:

FIG. 10 shows a block diagram of an overview of primary kinetic source devices with large starting energy demands of one embodiment. FIG. 10 shows devices with large starting energy demands including ac compressors and pumps 1000 and electric, diesel and gasoline motors 1004. In one embodiment devices with large starting energy demands are a group of primary kinetic sources 1002. A primary kinetic source axle 104 is coupled to a flywheel storage system 120. A flywheel is used for a kinetic energy transference device (KETD) 100 in a kinetic energy recovery system 810.

A first computer controlled module 840 is electronically coupled to a first speed governor 842. The first speed governor 842 is coupled to the kinetic energy transference device (KETD) 100 and to a first speed governed kinetic energy axle 844. The first speed governed kinetic energy axle 844 is coupled to devices with large starting energy demand running operation system 1020 and is a mechanism to control the rate of speed of the devices with large starting energy demand running operation system 1020.

A second computer controlled module 850 is electronically coupled to a second speed governor 852. The kinetic energy recovery system 810 determines any excess kinetic energy not needed by the devices with large starting energy demand running operation system 1020. The excess kinetic energy determined is passed through to a second speed governed kinetic energy axle 854 for transference to devices with large starting energy demand starting operation systems 1030 of one embodiment.

Figure 11:
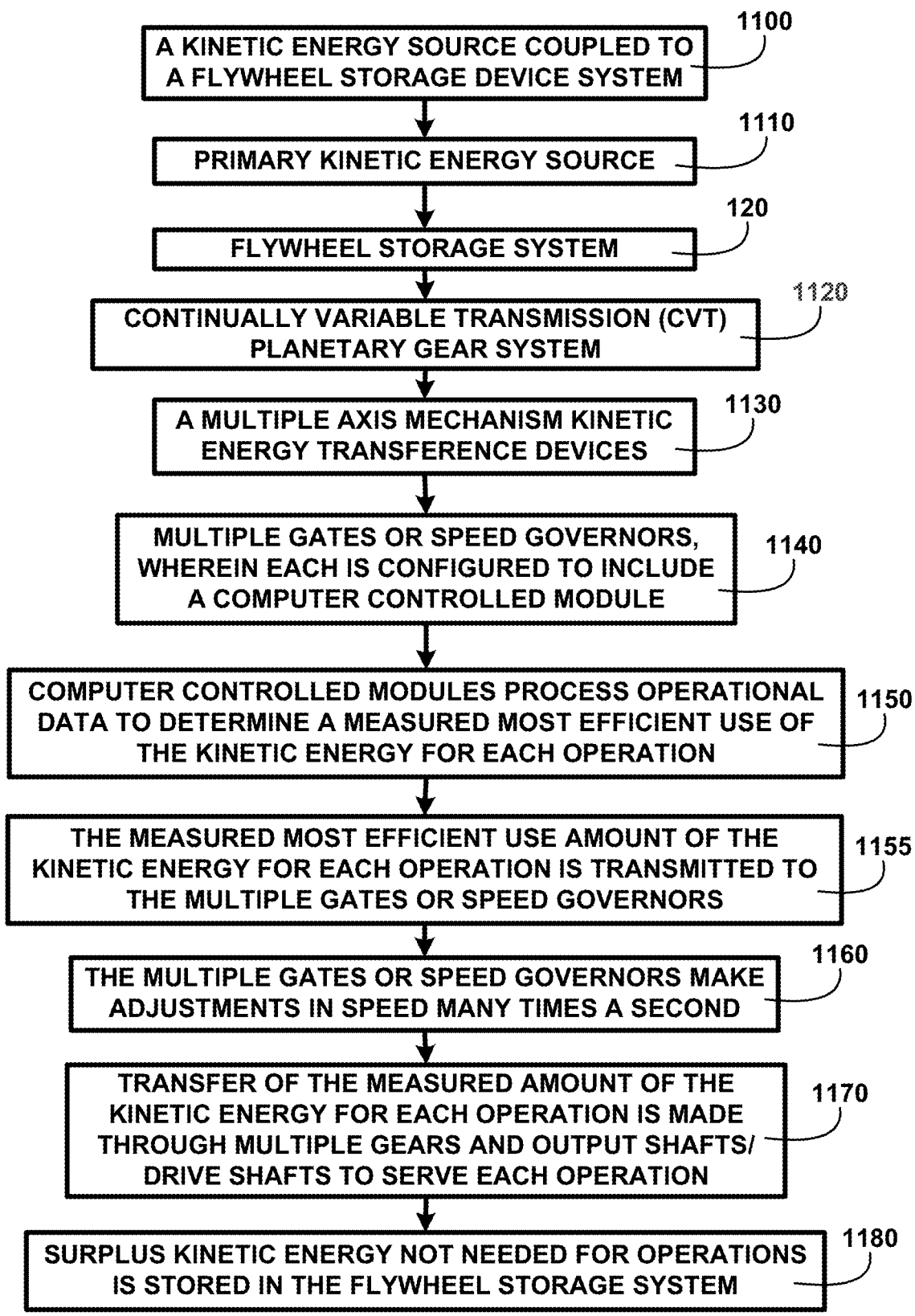
FIG. 11 shows for illustrative purposes only an example of a primary kinetic source of one embodiment.

A Primary Kinetic Source:

FIG. 11 shows for illustrative purposes only an example of a primary kinetic source of one embodiment. FIG. 11 shows a kinetic energy source coupled to a flywheel storage device system 1100. The primary kinetic energy source 1110 supply energy in the form of speed and force that in part may be stored in the flywheel storage system 120. A continually variable transmission (CVT) planetary gear system 1120 is a multiple axis mechanism kinetic energy transference devices 1130. The continually variable transmission (CVT) planetary gear system 1120 includes multiple gates or speed governors, wherein each is configured to include a computer controlled module 1140.

Computer controlled modules process operational data to determine a measured most efficient use of the kinetic energy for each operation 1150. The measured most efficient use amount of the kinetic energy for each operation is transmitted to the multiple gates or speed governors 1155. The multiple gates or speed governors make adjustments in speed many times a second 1160. Transfer of the measured amount of the kinetic energy for each operation is made through multiple gears and output shafts/drive shafts to serve each operation 1170. Surplus kinetic energy not needed for operations is stored in the flywheel storage system 1180 of one embodiment.

Figure 12:
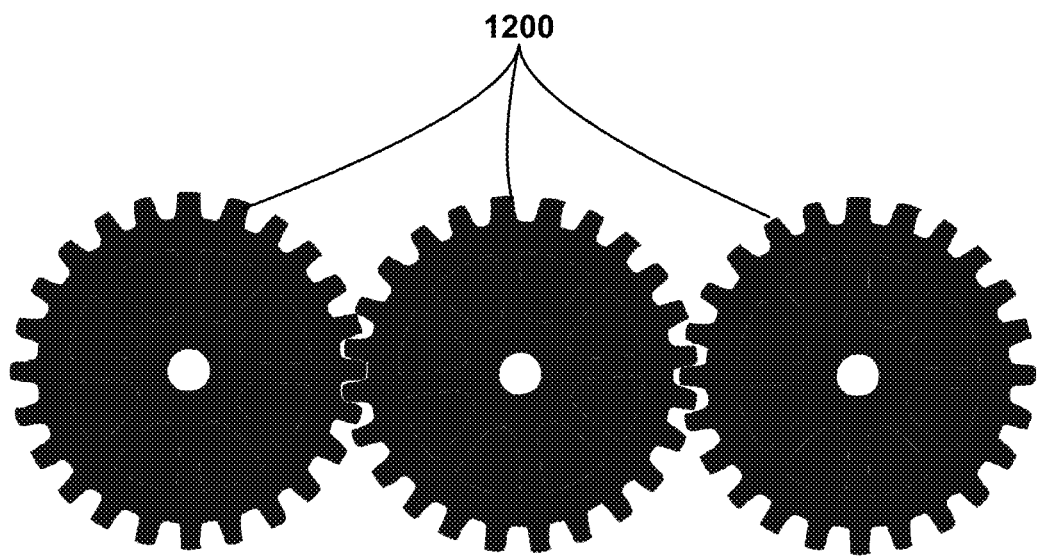
FIG. 12 shows for illustrative purposes only an example of a transfer gears of one embodiment.

FIG. 12 shows for illustrative purposes only an example of a transfer gears of one embodiment. FIG. 12 shows in one embodiment transfer gears are aligned side to side where in another embodiment the transfer gears are configured in a triangular orientation of one embodiment.

Figure 13:
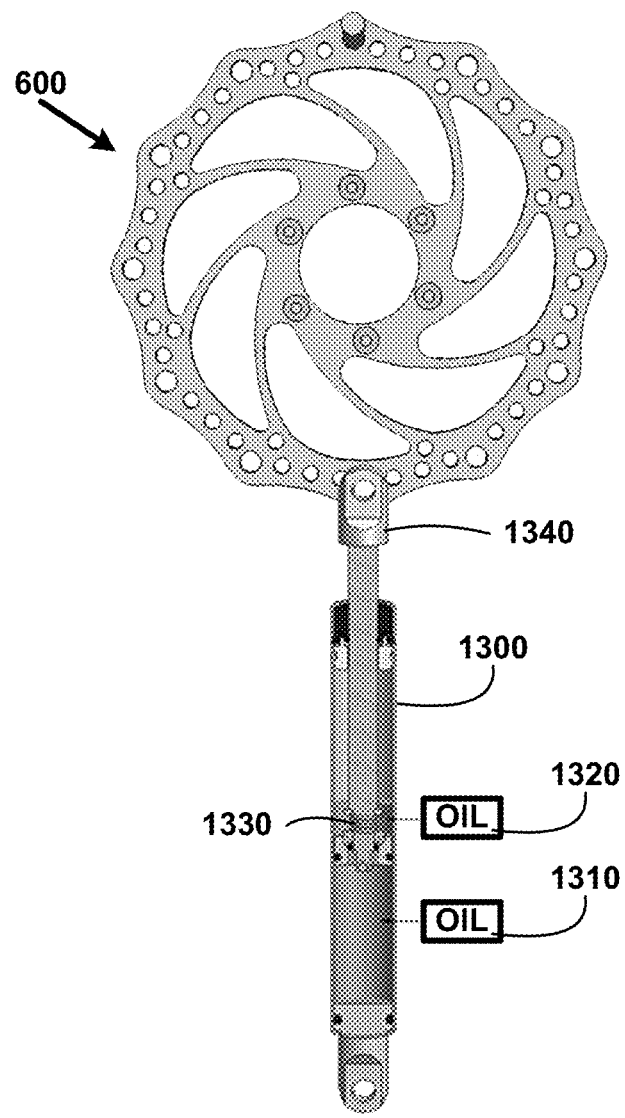
FIG. 13 shows for illustrative purposes only an example of a hydraulic actuator coupled to a lobed disc of one embodiment.

A Hydraulic Actuator 1300 Coupled to a Lobed Disc:

FIG. 13 shows for illustrative purposes only an example of a hydraulic actuator coupled to a lobed disc of one embodiment. FIG. 13 shows a hydraulic actuator 1300 coupled to a lobed disc 600 to transfer kinetic energy. The hydraulic actuator 1300 is also used as a shock absorber in autos. There is a valve 1330 at the end of the rod 1340 inside the chamber which controls the amount of fluid in this instance oil that can pass from beneath the rod 1310 to the area around the rod 1320. By adjusting this valve, the force needed to move the rod up or down becomes easier or harder. To act as a speed governor, this actuator connects to a wheel bearing that rides on the outer edge of the lobed disc 300.

As the disc above rotates, the lobes on the disc cause the actuator to go in and out. By controlling the valve 1330 in the actuator 1300, the force needed for the disc to turn increases or decreases. The greater the force applied to the actuator 1300, the equal amount of force exits the carrier of the CVT and the speed goes with it. This actuator valve can be controlled electronically and adjusted to direct the desired speed or force out the carrier shaft 750 of FIG. 7. The CVT control module takes input from the speed entering the CVT, the force that is being applied, the desired speed and force being called for, and the current speed force exiting the output/carrier shaft 750 of FIG. 7 of one embodiment.

Figure 14A:
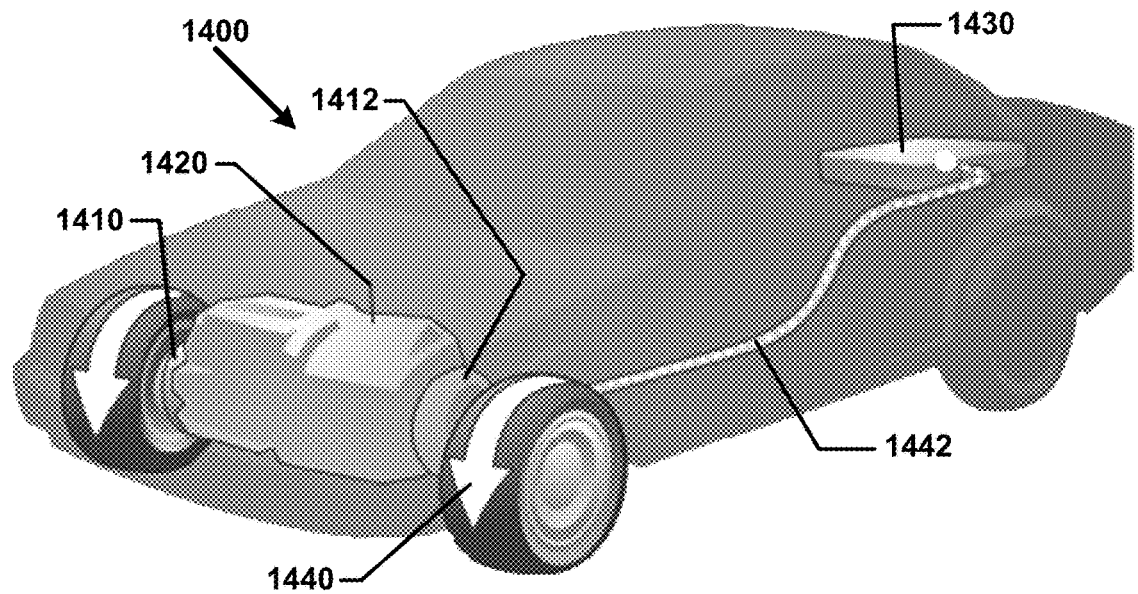
FIG. 14A shows for illustrative purposes only an example of a hybrid automobile regenerative brakes of one embodiment.

Hybrid Automobile Regenerative Brakes:

FIG. 14A shows for illustrative purposes only an example of a hybrid automobile regenerative brakes of one embodiment. FIG. 14A shows a hybrid automobile with regenerative brakes 1400. A right electric motor 1410 and at times a gasoline engine 1420 and a left electric motor 1412 provide power to the front wheels. Kinetic brake energy 1440 is developed when decelerating or stopping.

The kinetic brake energy 1440 is fed back to the battery 1430. The kinetic energy transference device 100 of FIG. 1 reduces the energy consumed for actual deceleration and stopping and transfers the increased recovered braking energy 1442 to the battery 1430 of one embodiment.

Figure 14B:
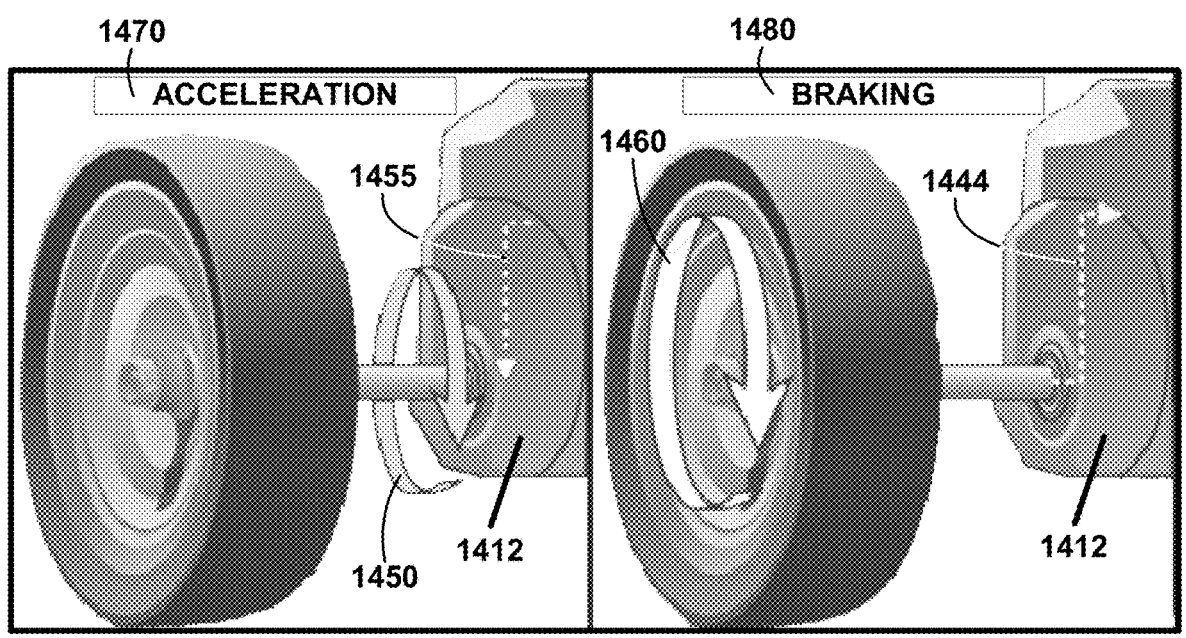
FIG. 14B shows for illustrative purposes only an example of acceleration and braking for hybrid automobile regenerative brakes of one embodiment.

FIG. 14B shows for illustrative purposes only an example of acceleration and braking for hybrid automobile regenerative brakes of one embodiment. FIG. 14B shows in the left panel an example of acceleration 1470. In this example, acceleration 1470 is being powered by the left electric motor 1412. Acceleration energy 1450 is supplemented using the stored kinetic energy from the kinetic energy transference device 100 of FIG. 1 thereby reducing the acceleration energy from left electric motor 1455 of one embodiment.

The right panel shows braking 1480 wherein energy from the left electric motor 1412 is conserved in part and kinetic brake energy 1460 is generated. The kinetic energy transference device 100 of FIG. 1 provides a portion of the braking energy needed reducing the energy needed to decelerate and increasing the recovered braking energy that is transferred 1444 to the battery 1430 of one embodiment.

Figure 15A:
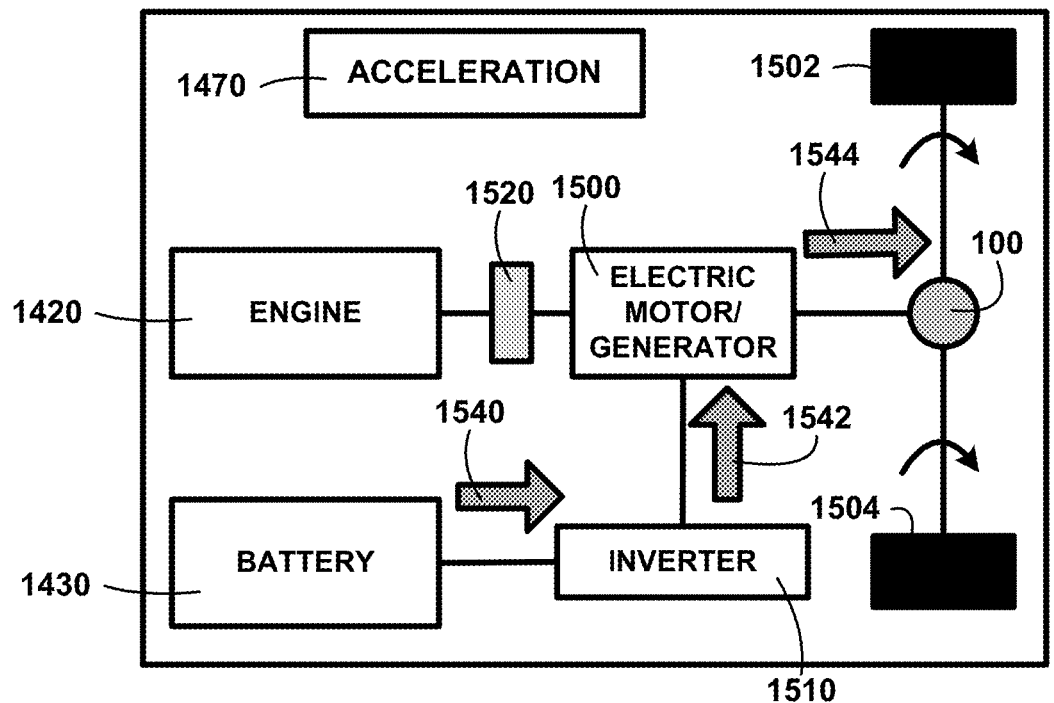
FIG. 15A shows for illustrative purposes only an example of acceleration kinetic energy flow of one embodiment.

Acceleration Kinetic Energy Flow:

FIG. 15A shows for illustrative purposes only an example of acceleration kinetic energy flow of one embodiment. FIG. 15A shows how kinetic energy flow for example in an automobile during acceleration 1470. Kinetic energy from an engine 1420 is transferred to a clutch 1520 to an electric motor/generator 1500. Additional energy is transferred 1540 from a battery 1430 to an inverter 1510 and transferred 1542 to the electric motor/generator 1500. The combined energy is transferred 1544 to the kinetic energy transference device 100 and split a left drive wheel 1502 and a right drive wheel 1504 of one embodiment.

Figure 15B:
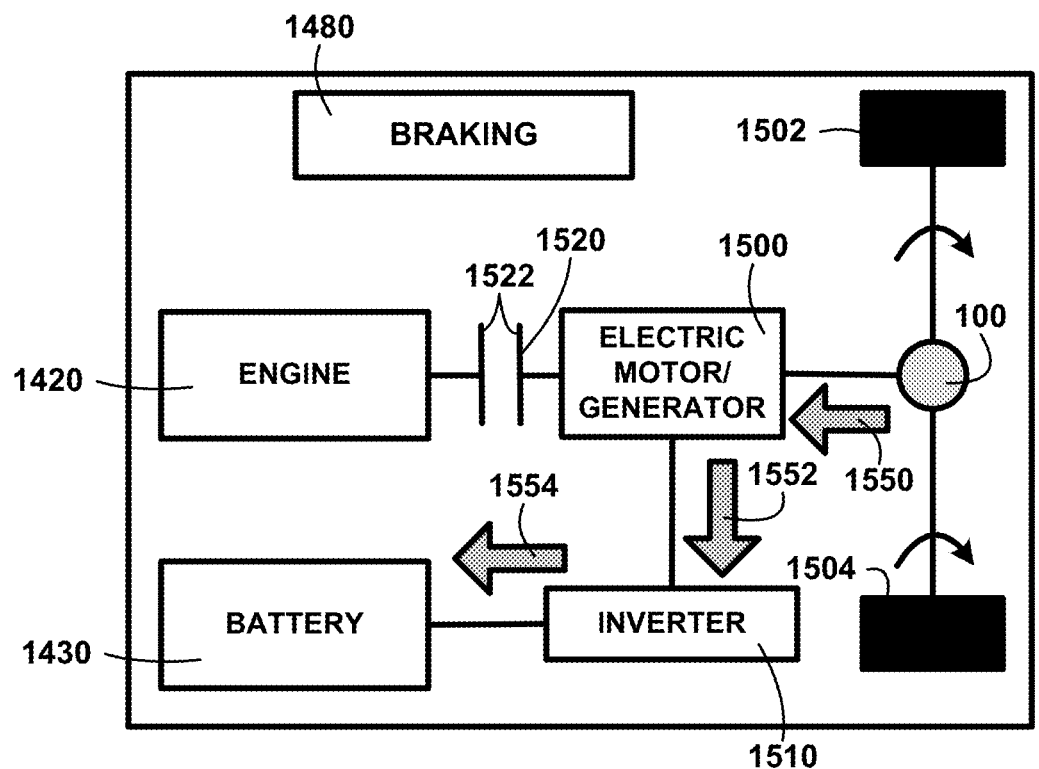
FIG. 15B shows for illustrative purposes only an example of braking kinetic energy flow of one embodiment.

Braking Kinetic Energy Flow:

FIG. 15B shows for illustrative purposes only an example of braking kinetic energy flow of one embodiment. FIG. 15B shows how kinetic energy flow for example in an automobile during braking 1480. Kinetic energy from an engine 1420 is not transferred 1522 through the clutch 1520 to an electric motor/generator 1500. The kinetic energy generated is transferred 1550 from the left wheel 1502 and right wheel 1504 through the kinetic energy transference device 100. The braking energy generated is converted to electricity in the electric motor/generator 1500. The converted electricity is transferred 1552 to the inverter 1510. The inverter 1510 regulates the characteristics of the electricity energy and transfers 1554 to the battery 1430 of one embodiment.

The CVT can recover as much energy as it can deliver as that limit is set by the gate or speed governor 500 and it doesn't matter which direction the energy is flowing. In and out requires the same mechanics so for the same cost to be able to recover 1500 horsepower, the CVT can also supply that much power too. If the specifications are for the CVT to be able to recover 1500 horsepower, then it can also deliver that much too and for no additional costs. If the flywheel and CVT can handle 1500 HP input, it can also deliver that much power if desired and for no additional cost.

Figure 16:
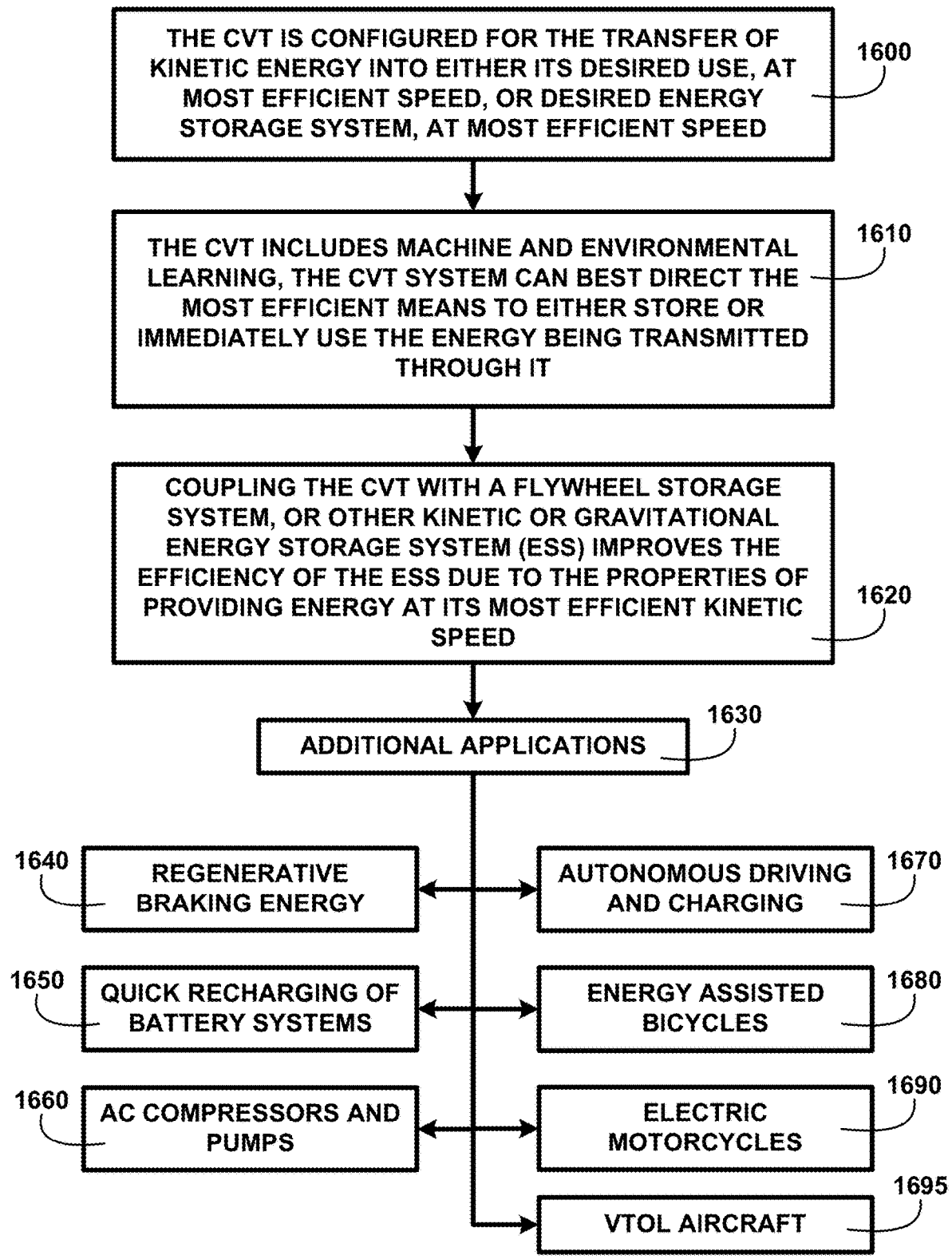
FIG. 16 shows for a block diagram of an overview of additional applications and features of one embodiment.

Additional Applications and Features:

FIG. 16 shows for a block diagram of an overview of additional applications and features of one embodiment. FIG. 16 shows additional applications and features of the kinetic energy transference device 100 of FIG. 1. The CVT is configured for the transfer of kinetic energy into its desired use, at most efficient speed, or desired energy storage system, at most efficient speed 1600.

The CVT includes machine and environmental learning, the CVT system can best direct the most efficient means to either store or immediately use the energy being transmitted through it 1610. Coupling the CVT with a flywheel storage system, or other kinetic or gravitational energy storage system (ESS) improves the efficiency of the ESS due to the properties of providing energy at its most efficient kinetic speed 1620.

The kinetic energy transference device 100 of FIG. 1 has additional applications 1630 other than automobiles. As described regenerative braking energy 1640 of vehicles and equipment that starts and stops recover energy that can reduce starting energy with the stored energy being applied to starting motors to reduce costs, wear and tear of motors, and save time by shorting the start-up period.

Quick recharging of battery systems 1650 is achieved through applying the stored energy in recharging system on top of the other energy sources. Reducing start-up time with stored energy augmenting normal power consumption also reduces stress on motors of AC compressors and pumps 1660.

Autonomous driving and charging 1670 is improved by reducing energy consumption and applying stored and recovered energy to extend driving time and distance. An autonomous auto can drive itself to the nearest most efficient charging station at times not desirable for most humans. Using the CVT and its learning systems, the auto can locate, calculate and arrive at the most efficient location to recharge its energy storage systems. At the charging station, the CVT system can determine and direct the energy into the most efficient storage system.

Riders of energy assisted bicycles 1680 do not need to work as hard as the kinetic energy transference device 100 of FIG. 1 will apply stored and recovered energy to add non-rider exerted effort to power the energy assisted bicycles 1680. Most energy assisted bicycles use electric motors and chemical batteries to assist. These systems are charged at home and also recover energy during their use. Instead of using electric motors and batteries, they can employ the CVT with flywheel storage. Keeping kinetic energy in its form is more efficient than transferring to and from chemical storage systems. A CVT bicycle system can provide greater range and less weight then other battery/electric systems. Additionally, a CVT with flywheel bicycle system can convert energy from its rider, through a crank system, to continually collect energy at a desired rate but deliver energy as needed such as the increase in the amount of energy needed for steep inclines.

The same is true for electric motorcycles 1690 with reducing energy consumption and applying stored and recovered energy to extend driving time and distance. Because the CVT can very efficiently transmit kinetic energy, systems using weights can be more efficient when employing the CVT to transmit the kinetic energy from the gravitational pull to the electrical generator. The same works in reverse for converting electricity to lift the weight again. In systems like windmills and hydro plants, keeping the energy in kinetic form is more efficient. Utilizing the CVT will increase the net amount of energy from a system by decreasing the amount of loss of energy during the charging and discharging phases. With machine learning, utilizing the CVT to direct where to store the energy will also increase the systems net efficiency.

The main use of energy for VTOL aircraft 1695 and most aircraft is to get the craft airborne. Current flywheel technology allows more energy density than batteries so using flywheels, coupled with the CVT, can provide better efficiency for the new wave of VTOL and electric aircraft. The high demands of energy for lifting an aircraft into flight mode can be better handled by drawing that energy from flywheels rather than batteries. This will lessen the weight needed if that energy had to come from batteries. Most current aircraft designs do not recover energy in the slowing down and landing portions of their flight. With the CVT, prior to landing, the craft can recover energy during the slow down and descent phases of the flight and store that energy in the flywheels to use again during the vertical landing phases. During traditional flights, the slow down and descent portion of the flight, the aircraft bleeds off speed gradually. This means the energy is being consumed by friction and not recovered. Our CVT will shorten this phase and recover the energy to use during the final landing phase. This will decrease the total flight time and allow passengers to reach their destination quicker and with less total energy needed of one embodiment.

Figure 17:
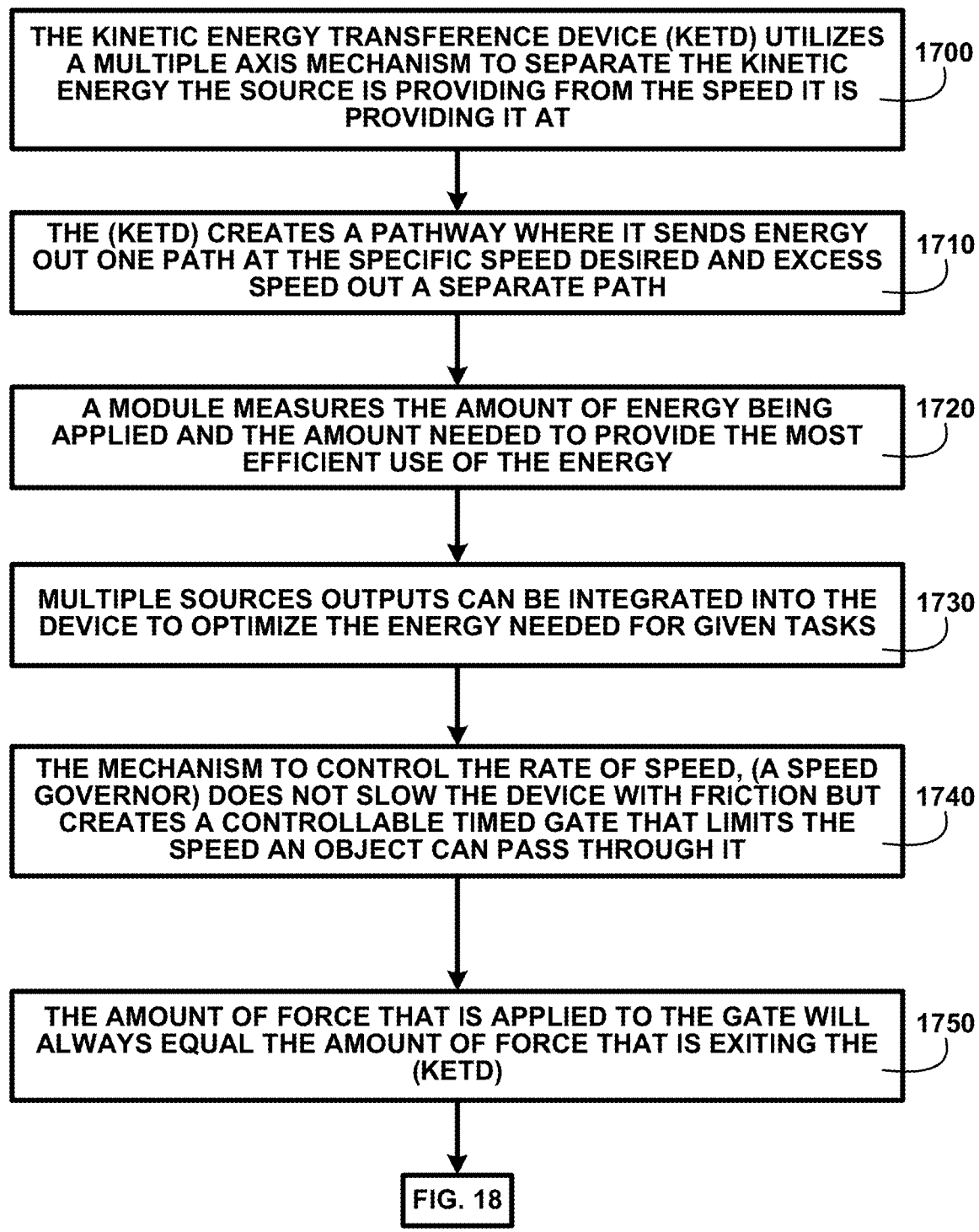
FIG. 17 shows a block diagram of an overview of a multiple axis mechanism of one embodiment.

Multiple Axis Mechanism:

FIG. 17 shows a block diagram of an overview of a multiple axis mechanism of one embodiment. FIG. 17 shows the kinetic energy transference device (KETD) utilizes a multiple axis mechanism to separate the kinetic energy the source is providing from the speed it is providing it at 1700. The (KETD) creates a pathway where it sends energy out one path at the specific speed desired and excess speed out a separate path 1710. A module measures the amount of energy being applied and the amount needed to provide the most efficient use of the energy 1720. Multiple sources of outputs can be integrated into the device to optimize the energy needed for given tasks 1730. The mechanism to control the rate of speed, (a speed governor) does not slow the device with friction but creates a controllable timed gate that limits the speed an object can pass through it 1740. The amount of force that is applied to the gate will always equals the amount of force that is exiting the (KETD) 1750 of one embodiment. The descriptions continue in FIG. 18.

Figure 18:
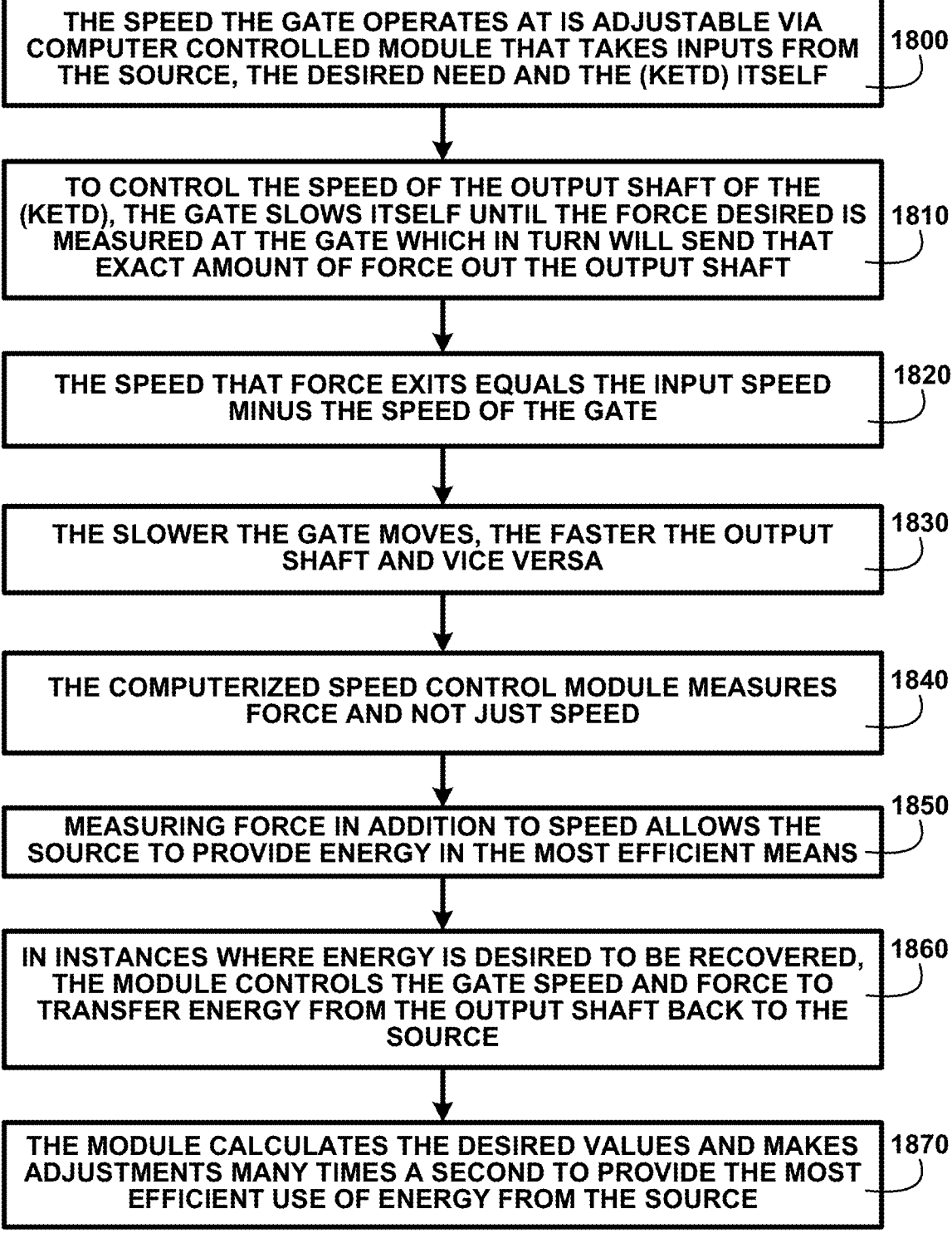
FIG. 18 shows a block diagram of an overview of KETD features of one embodiment.

KETD Features:

FIG. 18 shows a block diagram of an overview of KETD features of one embodiment. FIG. 18 shows a continuation from FIG. 17 with the speed the gate operates at is adjustable via computer controlled module that takes inputs from the source, the desired need and the (KETD) itself 1800. To control the speed of the output shaft of the (KETD), the gate slows itself until the force desired is measured at the gate which in turn will send that exact amount of force out the output shaft 1810. The speed that forces exits equals the input speed minus the speed of the gate 1820. The slower the gate moves, the faster the output shaft and vice versa 1830. The computerized speed control module measures force and not just speed 1840. Measuring force in addition to speed allows the source to provide energy in the most efficient means 1850. In instances where energy is desired to be recovered, the module controls the gate speed and force to transfer energy from the output shaft back to the source 1860. The module calculates the desired values and makes adjustments many times a second to provide the most efficient use of energy from the source 1870 of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method, comprising:
transferring kinetic energy from a kinetic energy source to a flywheel storage device system;
transferring all or a portion of the kinetic energy stored in the flywheel storage system to a continually variable transmission planetary gear system;
integrating a multiple axis mechanism kinetic energy transference device to the continually variable transmission planetary gear system;
integrating multiple speed governors in the multiple axis mechanism kinetic energy transference devices;
coupling a computer controlled module to each of the speed governors;
processing operational data with the computer controlled modules to determine a measured most efficient use of the kinetic energy for each operation;
transmitting the operation measured most efficient use amount of the kinetic energy from the computer controlled module to the corresponding speed governor;
transferring the measured amount of the kinetic energy through gears and output shafts/drive shafts to serve each operation many times a second; and
storing surplus kinetic energy not needed for operations in the flywheel storage system.

2. The method of claim 1, further comprising processing operational data with the computer controlled module to determine if additional kinetic energy is needed to complete the measured most efficient use of the kinetic energy for each operation.

3. The method of claim 1, further comprising providing adjustments in kinetic energy control devices with the speed governors to transfer additional kinetic energy to an operation system.

4. The method of claim 1, further comprising coupling a kinetic energy recovery system to the computer controlled modules for determining any excess kinetic energy not needed by operations.

5. The method of claim 1, further comprising providing at least one digital processor in each computer controlled module for determining the measured most efficient use of the kinetic energy for each operation.

6. The method of claim 1, further comprising coupling at least one transceiver to each computer controlled module and each speed governor for providing bidirectional signals for wirelessly transmitting data.

7. The method of claim 1, further comprising providing hard wired cabling for transmitting data between each of the computer controlled modules and each of the speed governors.

8. The method of claim 1, further comprising providing a separate path to a KETD flywheel surplus kinetic energy transfer gear to transfer excess speed not needed for operations.

9. An apparatus, comprising:
    a flywheel storage device system coupled to a kinetic energy source;
    a continually variable transmission planetary gear system coupled to the flywheel storage device system;
    an integrated multiple axis mechanism kinetic energy transference devices coupled to the continually variable transmission planetary gear system;
    at least one speed governor coupled to the multiple axis mechanism kinetic energy transference devices;
    a computer controlled module coupled to each of the speed governors;
    a plurality of gears coupled to the speed governors; and
    a plurality of output shafts/drive shafts coupled to the speed governors.

10. The apparatus of claim 9, further comprising providing at least one digital processor coupled to the computer controlled module for processing operational data with the computer controlled modules to determine a measured most efficient use of the kinetic energy for each operation.

11. The apparatus of claim 9, further comprising at least one transceiver coupled to the computer controlled modules and speed governors configured for transmitting operation measured most efficient use amount of the kinetic energy.

12. The apparatus of claim 9, further comprising a kinetic energy recovery system for storing surplus kinetic energy not needed for operations in the flywheel storage system.

13. The apparatus of claim 9, further comprising at least one kinetic energy control device coupled to each speed governor configured for adjusting the transfer of kinetic energy to a speed governed kinetic energy axle.

14. The apparatus of claim 9, further comprising the plurality of gears configured for transferring kinetic energy to operational systems using a plurality of output shafts/drive shafts coupled to the speed governors.

15. An apparatus, comprising:
    a kinetic energy transference device coupled to a primary kinetic energy source;
    a flywheel storage device system coupled to the kinetic energy transference device;
    a plurality of kinetic energy transfer gears coupled to the kinetic energy transference device;
    at least one speed governor coupled to each of the plurality of kinetic energy transfer gears;
    at least one speed governed kinetic energy axle coupled to a speed governor;
    a computer controlled module coupled to the speed governor; and
    a kinetic energy use operational system coupled to at least one speed governed kinetic energy axle.

16. The apparatus of claim 15, further comprising at least one digital processor coupled to each computer controlled module for determining a measured most efficient use of the kinetic energy for each operational system.

17. The apparatus of claim 15, further comprising a kinetic energy recovery system coupled to the computer controlled modules for determining any excess kinetic energy not needed by operations and transferring the excess kinetic energy to the flywheel storage device system.

18. The apparatus of claim 15, further comprising at least one transceiver coupled to each computer controlled module and each speed governor for providing bidirectional signals for wirelessly transmission of data.

19. The apparatus of claim 15, further comprising the computer controlled module is configured for processing operational data to determine if additional kinetic energy is needed to maintain a measured most efficient use of the kinetic energy for each operational system.

20. The apparatus of claim 15, further comprising the speed governors configured for providing adjustments in kinetic energy control devices to transfer additional kinetic energy to an operational system.

* * * * *